United States Patent [11] 3,596,130

[72] Inventor Melvin D. Clark
Box 11602, Albuquerque, N. Mex. 87112
[21] Appl. No. 786,335
[22] Filed Dec. 23, 1968
[45] Patented July 27, 1971

[54] STRIP TRANSMISSION LINE OSCILLATOR
7 Claims, 7 Drawing Figs.

[52] U.S. Cl. 315/39, 331/78, 333/84 M, 29/600
[51] Int. Cl. H01j 7/46, H01j 17/80
[50] Field of Search 315/39; 331/98; 333/84 M; 29/25.13

[56] References Cited
UNITED STATES PATENTS

| | | | |
|---|---|---|---|
| 3,237,122 | 2/1966 | Campi | 331/98 |
| 3,360,743 | 12/1967 | Clark | 331/98 |
| 3,419,813 | 12/1968 | Kamnitsis | 333/84 M |

FOREIGN PATENTS

| | | | |
|---|---|---|---|
| 655,803 | 8/1951 | Great Britain | 333/84 M |

*Primary Examiner*—Herman Karl Saalbach
*Assistant Examiner*—Saxfield Chatmon, Jr.
*Attorney*—James E. Snead

ABSTRACT: An improved strip transmission line oscillator, having an adjustable plate transmission line to match the characteristics of the particular tube used in the oscillator to achieve optimum output of the oscillator, and a heat sink attached to the anode of the oscillator, and a new and improved method for assembling the oscillator.

MELVIN D. CLARK
Inventor
BY [signature]
Attorney

STRIP TRANSMISSION LINE OSCILLATOR

This invention relates to improvements in strip transmission line oscillators.

I have pending before the U.S. Patent Office an application, Ser. No. 562,593, for a patent on my distributed feedback strip transmission line oscillator. In that application, I described the structure and function of my novel oscillator utilizing strip transmission lines for the plate and grid lines and achieving feedback by the distributed capacitance and inductance of the two transmission lines.

Through experimentation with my distributed feedback strip transmission line oscillator, I have found certain inadequacies in its operation and assembly, and I have made certain improvements in the device which are the subject of this application for letters patent.

In my experimentation with my distributed feedback strip transmission line oscillator, I have discovered that the length and width of the plate line has a definite bearing on its characteristics, and I have found that it is desirable to be able to adjust the plate transmission line to match the characteristics of the particular tube used in the oscillator to achieve optimum output of the oscillator. Moreover, when my oscillator invention is operated at high average power levels, the anode tends to overheat and thus interfere with the operation of the oscillator. In using my previous invention at high temperatures or in environments with great heat, I have discovered that the dielectric boards on which the plate and grid transmission lines are located tend to warp, thus also interfering with the operation of my oscillator.

It is, therefore, an object of my invention to provide an improved strip transmission line oscillator wherein the plate transmission lines may be adjusted to match the particular characteristics of the oscillator in use and to achieve optimum output thereof.

It is a further object of my invention to provide an improved strip transmission line oscillator that may be operated at high average power levels without overheating the anode.

It is a further object of my invention to provide an improved strip transmission line oscillator that may be assembled and operated at or in high temperature levels without disturbing the assembly of the oscillator.

My improved strip transmission line oscillator consists in general of a stacked or planar triode tube assembled in conjunction with three dielectric boards having located thereon a strip transmission plate line and strip transmission grid line, each of which lines are etched onto one or more of the dielectric boards. I provide a heat sink at the anode of the tube to conduct excessive heat away from the tube when it is operated at high average power levels. I provide a means for assembling the three dielectric boards into a unitary structure which may be operated at or in high temperature levels without the boards warping and thus distorting the characteristics of the oscillator.

Many further objects and novel features of my invention will appear as the same is better understood by the following specifications when taken in conjunction with the drawings wherein.

Figure 1:
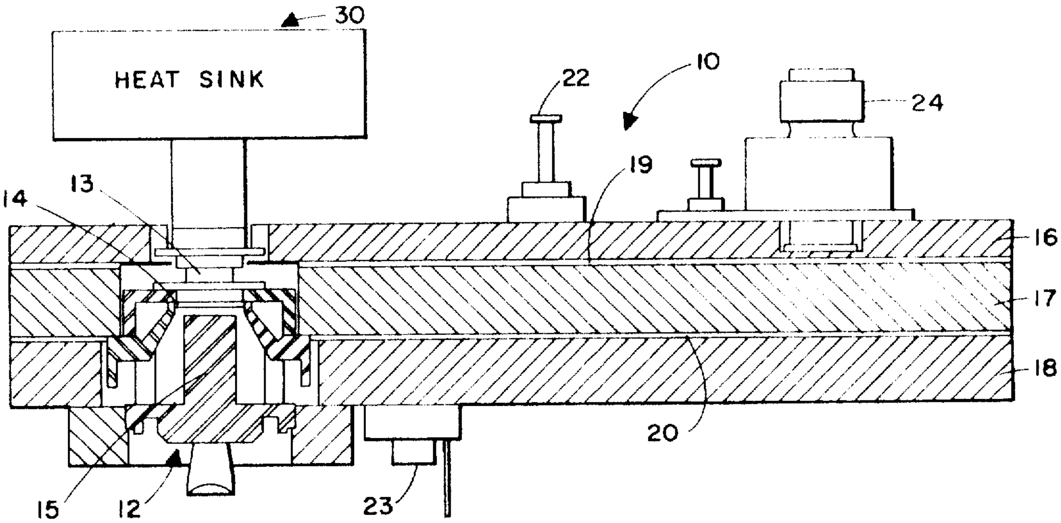
FIG. 1 is a cross sectional view of my oscillator, assembled, with the tube, heat sink and dielectric boards in operative position.

Referring now to the drawings wherein like numerals represent like parts to my invention it will be seen that the improved strip transmission line oscillator 10 which comprises my invention consists of a stacked or planar triode tube 12, having an anode 13, a grid 14 and cathode 15. Dielectric boards carrying plate line 19 and grid line 20 are stacked and connected to tube 12 in manner to be hereinafter more particularly described. Plate feed 22 is inserted into the assembly into contact with the plate line 19, and grid feed 23 is inserted into contact with grid line 20. A capacitance R.F. output probe 24 is provided as shown. As described in my previous application, this probe may be a coaxial connector modified to provide a variable capacity coupling between the center conductor of the connector and the plate line 19.

Figure 2:
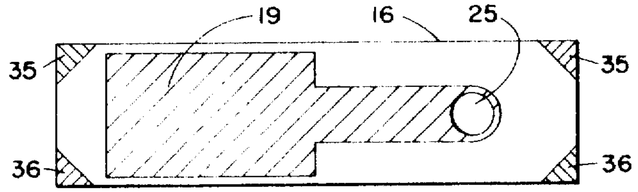
FIGS. 2 and 3 are plan views of dielectric boards showing two modifications of my improved plate transmission line.
Figure 3:
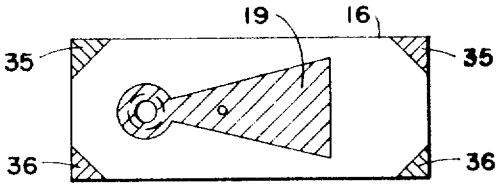

Referring now to FIGS. 2 and 3, I show two modifications of the plate line which comprise a part of my invention. It will be recalled that in my previous patent application now U.S. Pat. No. 3,360,743, I disclosed that the relative widths of the grid line and the plate line may vary according to frequency, tube type and whether the oscillator is to be used as a transmitter or receiver. The disclosure in my previous application is of a straight plate line which shows a fixed impedance to the tube. I have discovered that with this type plate line it is impossible to adjust the load on the tube to achieve optimum efficiency of the oscillator. Moreover, with the plate line as shown in my previous application, it is often not possible to get maximum power output from the oscillator due to mismatching of the characteristics of the oscillator.

The oscillator as disclosed in my previous invention cannot be optimized with respect to plate efficiency and it does not operate properly in applications where maximum power is desired. It is well known that the impedance of a strip transmission line is a function of the width of the line. Therefore variation of the width of the line 19 varies the impedance $Z_2$ looking into the line. If the plate transmission line 19 varies in width along its length either by a stepping manner as shown in FIG. 2 or by tapering as shown in FIG. 3 its impedance also varies. The impedance of a tapered plate transmission line shown in FIG. 3 varies as a straight line function of the length of the line since the width varies uniformly along the length. The modification of transmission line 19 shown in FIG. 3 has two opposite tapered sides making it wedge shaped in appearance.

Figure 7:
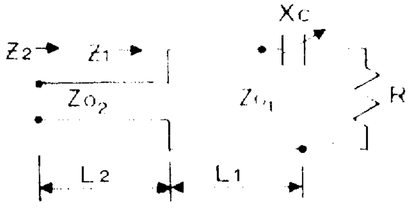
FIG. 7 is a schematic diagram of one modification of my invention.

Referring now to FIG. 7, I show a schematic representation of the plate line separated into two lines having lengths $L_1$ and $L_2$. $Z_1$ represents the impedance seen looking into line 1 and is a function of the length ($L_1$) of line 1 and the characteristic impedance $Z_{01}$ of line 1. From transmission line theory $Z_1$ can be represented by the formula shown below. $R_L$ represents the load on the oscillator and $X_C$ represents the capacitance of the R.F. output probe. When the lines are rejoined $Z_1$ becomes the load attached to line 2 and $Z_2$ is the impedance seen looking into line 2 and is the load on the tube. $Z_2$ is a function of the length ($L_2$) of line 2 and the characteristic impedance $Z_{02}$ of line 2 and from transmission line theory $Z_2$ can be represented by the formula shown below. In the particul - modification of my invention shown in FIG. 2, the impedance $Z_2$ varies as a function of $Z_{01}$ and $Z_{02}$, and $L_1$ and $L_2$, where $L_1$ and $L_2$ represent the length of the two lines. Impedance $Z_1$ and $Z_2$ are arrived at according to the following formulas respectively:

$$Z_1 = Z_{01}\frac{Z_R + Z_{01}\ \tanh\ L_1}{Z_0 + Z_R\ \tanh\ L_1}$$

where $Z_R = R_L - iX_c$ and:

$$Z_2 = Z_{02}\frac{Z_1 + Z_{02}\ \tanh\ L_2}{Z_0 + Z_1\ \tanh\ L_2}$$

Thus, it becomes clear from the disclosure above that the impedance or load seen by the tube at the plate may be varied in accordance with the widths or lengths of the segments of the plate transmission line 19.

In the modification shown in FIG. 3 the characteristic impedance of the line varies as a straight line function of the width, and the impedance which the tube sees can be varied by varying the length of the line or by varying the degree of the taper of the line. Thus, the load displayed to the oscillator tube can be readily adapted to meet the characteristics of the tube and to optimize the efficiency of the tube and its output depending on the conditions under which it is to be operated.

As mentioned before, I have discovered that when my oscillator is operated at high average power there is a tendency to overheat the anode of the tube. I have, therefore, added a heat sink to be attached to the tube to eliminate overheating during operation.

Figure 6:
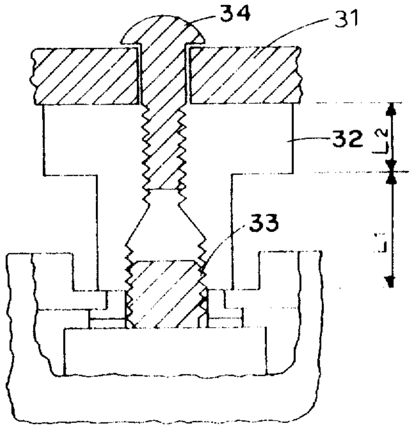
FIG. 6 is a detailed partial cutaway view of the heat sink comprising a part of my invention.
Figure 4:
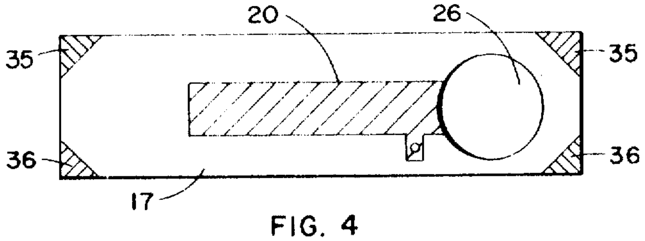
FIG. 4 is a plan view of a dielectric board having the grid transmission line etched thereon.
Figure 5:
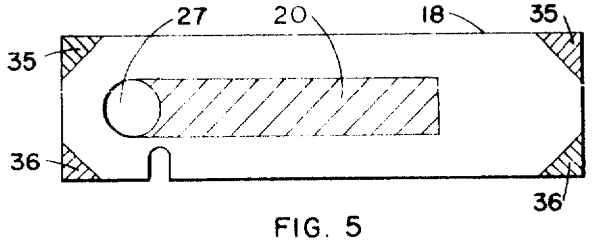
FIG. 5 is a plan view of the third dielectric circuit board comprising a part of this invention.

Referring now to FIGS. 1 and 6, I show my heat sink 30 comprising a heat conducting medium such as copper, aluminum or some other heat conductive material 31. Heat sink 31 is connected to anode 13 by a heat coupler 32. The material comprising heat coupler 32 must be heat conductive, but it must also provide insulation against electrical transmission or radio frequency transmission, so that it will not interfere with the operation of the oscillator. To prevent R.F. radiation $L_1+L_2$ should be approximately one-eighth to one-fourth of the operating wavelength in the dielectric. Any suitable material such as beryllium oxide may be used. Heat coupler 32 is connected to anode 13 by any suitable means to form a good connection such as a screw joint 33. Heat sink 31 and heat coupler 32 are connected together by any suitable means such as by a screw 34. Thus, it may be seen that the connection of heat coupler 32 to anode 13 conducts excess heat away from the anode into heat sink 31. The electrical and R.F. insulation provided by heat coupler 32 allows excess heat to be conducted from anode 13 but prevents interference by the heat sink with the operation of oscillator 10.

As stated before, I have discovered that operation of my oscillator at or in high temperatures tends to cause dielectric circuit boards 16, 17 and 18 to warp, thus interfering with the operation of the oscillator 10. In order to prevent such interference and to provide easy assembling of my invention, I have improved the assembly by etching the plate line 19 on the under or lower side of dielectric board 16 and on the upper side of dielectric board 17 in such a manner that both plate lines correspond when assembled. Likewise, I have etched grid line 20 on the lower surface of circuit board 17 and the upper surface of circuit board 18 in such a manner that when a device is assembled, all portions of the two surfaces of grid line 20 correspond. The bonding agent between the grid and plate lines must have electrical characteristics which are the same as the normal electrical connectors.

I have discovered that tin lead is a good material for such use since it is heat soluble at low temperatures and has electrical characteristics similar to copper.

I have further enhanced the assembly of my invention by providing tabs 35 and 36 on the corners of the dielectric boards 16, 17 and 18. Dielectric board 16 has one tab on each corner on the lower side and board 17 has tabs on each corner of the upper and lower sides while third board 18 has tabs on only the upper side. These tabs are plated with the same material as that which is plated on the plate and grid lines so that all of the bonding material will melt at the same temperature. The assembly of my device is accomplished as follows:

Dielectric boards 16, 17 and 18 are placed in their respective positions on the stacked or planar triode tube 12 in such a manner that the aperture 25 in plate line 19 contacts the plate 13 of tube 12. Aperture 26 of grid line 20 contacts grid 14 of tube 12. Aperture 27 of third circuit board 18 surrounds the cathode portions of tube 12. When these parts of the oscillator are thus assembled, the two matching surfaces of plate lines 19 correspond exactly to one another and the two matching surfaces of grid line 20 also correspond. The entire assembly in then clamped together by any suitable means and the assembly heated to a temperature corresponding to the melting point of the bonding material plated on the plate grid lines and the tabs 35 and 36. Tube 12 may be removed from the assembly or it may be left in position as desired. When the material reaches its melting point the opposed surfaces of the tabs and the lines fuse together thus forming a unitary structure between the dielectric boards. When the material cools and solidifies, the assembly is a solid structure and thus the boards are prevented from being warped even when operated at high temperatures. The integrity of the lines is thus maintained throughout operation even if high temperatures are encountered.

Of course, the top of dielectric board 16 and the bottom of dielectric board 18 are connected with electrical conductive material to provide a common ground point for the oscillator as described in my previous invention. Plate feed 22 and grid fee 23 as well as coaxial connector 24 are inserted into the oscillator in their respective apertures in the dielectric circuit boards after the assembly of the dielectric boards when the oscillator is complete. At this point the oscillator is ready for use.

Obviously many modifications and variations of my invention are possible in the light of the above teachings. It is, therefore to be understood that within the scope of the appended claims my invention may be practiced otherwise than as specifically described.

What I claim is:

1. In a strip transmission line oscillator, the combination comprising:

Upper, middle and lower dielectric boards, stacked one on the other, consisting of a dielectric material;

a plate transmission line having a first part affixed to the lower surface of said upper dielectric board and a second part affixed to the surface of said middle dielectric board, said first and said second parts corresponding one to the other when said dielectric boards are assembled;

a grid transmission line having a first part affixed to the lower surface of said middle dielectric board and a second part affixed to the upper surface of said lower dielectric board, said first and said second parts corresponding one to the other when said dielectric boards are assembled;

a bonding material having compatible electrical characteristics with said plate and grid transmission lines plated on the surfaces of said first and second plate and grid transmission lines, said bonding material being heat soluble at relatively low temperatures, whereby when said dielectric boards are stacked one on the other and the assembly is exposed to high temperature, said bonding material melts and adjacent parts flow together thus bonding said dielectric boards together;

said upper dielectric board having a clad upper surface;

said lower dielectric board having a clad lower surface; and a stacked ceramic triode tube having an anode operably connected to the plate transmission line, a cathode operably connected to the clad surface of said lower dielectric board, and a grid operably connected to said grid transmission line.

2. The combination as defined in claim 1, wherein:

said plate and grid transmission lines are construct. l of a soft, electrically conductive material, such as copper, whereby portions of said material may be removed after it is attached to its respective dielectric board to alter the impedance of the line;

said plate transmission line comprising a first section and a second section, each section having a rectangular configuration, said first section having a aperture at one end to receive and operably connect said plate transmission line to the anode of said stacked ceramic triode tube;

said first and said second sections of said plate transmission line being of different widths to form a stepped plate line, whereby the impedance seen by the tube may be varied by altering the length or width of the steps.

3. The combination as defined in claim 1, wherein:

said plate and grid transmission lines are constructed of a soft, electrically conductive material, such as copper, whereby portions of said material may be removed after it is attached to its respective dielectric board to alter the impedance of the line;

each of said transmission lines having two opposite tapered sides making it wedge shaped in appearance;

whereby, the width of said transmission lines varies as a straight line function of its length.

4. The combination as defined in claim 1, including:

a heat sink connected in a heat conduction relationship to the anode of said stacked ceramic triode tube;

electrical insulation means connecting said anode to said heat sink, whereby the heat from said anode is conducted to said heat sink, but said heat sink is electrically insulated from said anode.

5. The combination as defined in claim 1, including:

Attachment tabs located on the corners of the lower surface of said upper dielectric board, on the corners of the upper and lower surfaces of said middle dielectric board, and on the upper surface of said lower dielectric board;

said attachment tabs being composed of the same metallic material as said plate and grid transmission lines, so that when the metallic material is heated to its melting point the oppositely opposed metallic surfaces will fuse together to form a unitary structure.

6. A method of assembling a strip transmission line oscillator into a unitary structure, comprising the steps of:

providing upper, middle and lower dielectric circuit boards, each having upper and lower surfaces;

affixing a first part of a plate transmission line to the lower surface of the upper dielectric board;

affixing a second part of a plate transmission line to the upper surface of the middle dielectric board;

shaping the second part of said plate transmission line;

shaping the second part of said grid transmission line to the same configuration as the first part, and positioning it on the lower dielectric board so as to correspond at all points with the first part when the middle dielectric board is stacked on the lower dielectric board;

plating an electrically conductive, heat soluble bonding material on the surfaces of each part of said plate and grid transmission lines;

stacking said upper, middle and lower dielectric boards one on the other so that the two parts of each transmission line correspond at all points to form an assembly;

clamping the dielectric boards in stacked relationship;

exposing the assembly to heat of a sufficient temperature to melt the bonding material and fuse the two parts of each transmission line together;

electrically connecting a stacked ceramic triode tube to said plate and grid transmission lines;

removing the heat source and the clamp.

7. The method as defined in claim 6, including the steps of:

affixing a heat soluble bonding material to the outer periphery of the lower surface of the upper dielectric board, to the outer periphery of the upper and lower surfaces of the middle dielectric board, and to the outer periphery of the upper surface of the lower dielectric board so that the bonding material on each adjacent board corresponds when the boards are stacked one on the other.